June 2, 1925.   1,540,380
W. G. WILSON
VALVE
Filed Oct. 20, 1922   2 Sheets-Sheet 1

INVENTOR.
Wylie G. Wilson
BY
ATTORNEYS.

June 2, 1925.  W. G. WILSON  1,540,380
VALVE
Filed Oct. 20, 1922   2 Sheets-Sheet 2
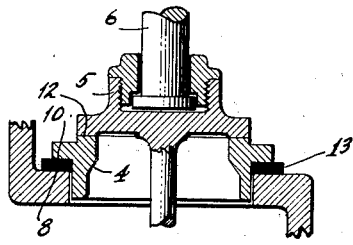
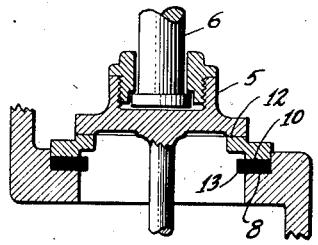
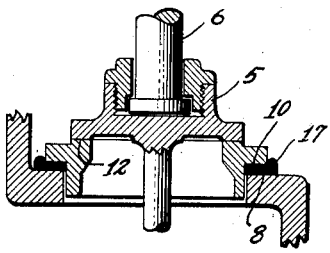
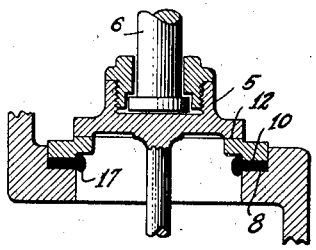
Fig. 4
Fig. 5
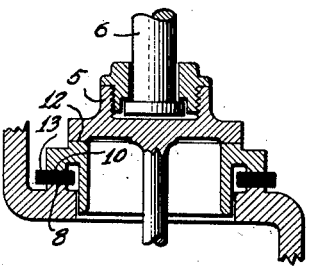
Fig. 6
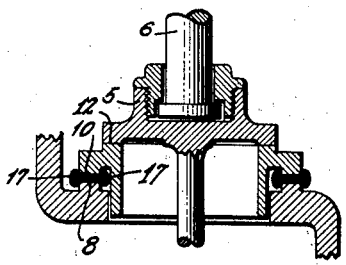
INVENTOR.
Wylie G. Wilson
BY
his ATTORNEYS.

Patented June 2, 1925.

1,540,380

UNITED STATES PATENT OFFICE.

WYLIE G. WILSON, OF JERSEY CITY, NEW JERSEY, ASSIGNOR TO LOOSE SEAT VALVE COMPANY, A CORPORATION OF DELAWARE.

VALVE.

Application filed October 20, 1922. Serial No. 595,780.

*To all whom it may concern:*

Be it known that I, WYLIE G. WILSON, a subject of the King of Great Britain, and resident of Jersey City, in the county of Hudson and State of New Jersey, have invented certain new and useful Improvements Pertaining to Valves, of which the following is a specification.

This invention relates to an improvement in valves and is more particularly addressed to the providing of a sealing means interposed between a removable valve seat and a port with which said valve seat is adapted to cooperate, such means comprising a gasket interposed between such elements in such a way that it is affected not only by pressure exerted upon the valve seat to accomplish said seal, but also by fluid pressure controlled by the valve.

The gasket in question is formed of a suitable material to form a seal and has the characteristic of being normally of uniform thickness and compressible and when compressed in part of its width while the other part is free to retain its normal position to flow or expand in a manner to form a seal and at the same time to expose to the fluid pressure a surface adapted to be affected thereby.

The invention is illustrated in the accompanying drawings, wherein

Figs. 4, 5 and 6 are details in vertical section showing various forms in which the invention may be applied. The structures are designated by numerals, like parts being referred to by like numerals.

Figure 1:
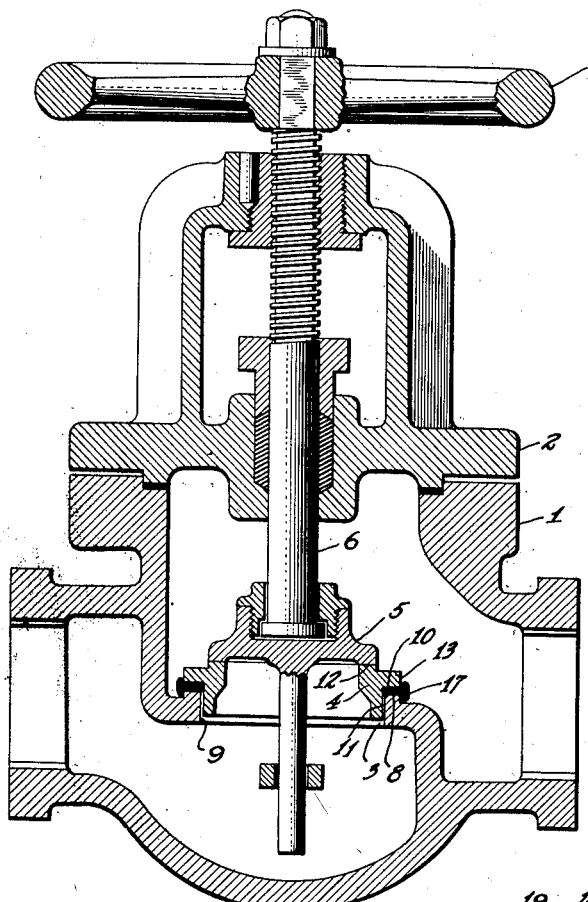
Fig. 1 is a vertical section of a conventional valve structure illustrating a removable valve seat mounted in the port of a valve with a gasket interposed and pressure applied to the valve seat.

1 is the body of a valve casing and 2 the head thereof. 3 is a port of a valve casing; 4 is a removable valve seat adapted to be seated in said port. 5 is a valve adapted to cooperate with said removable valve seat and controlled by a valve stem 6 operated by a hand wheel 7. The port 3 is provided with a face at right angles to the axis of the port as 8 and also a face 9 parallel with the axis of the said port. The valve seat 4 is provided with a face as 10 at right angles to the axis of a port through the center of said removable valve seat and also with a face 11 parallel with the axis of the port through the center of the valve seat. It is also provided with a face 12 adapted to cooperate with the corresponding face of the valve 5. 13 is a gasket formed of suitable material and having the characteristic of being normally of uniform thickness and capable of compression. This gasket, it will be noted, is interposed between the faces 8 of the port and 10 of the removable valve seat. It will also be noted that it is wider than said faces. In the drawing Fig. 2 this gasket is shown before pressure is exerted thereon. In Fig. 1 is illustrated the result of the exercise of pressure upon the gasket by the compression of the removable valve seat. In Fig. 3 an attempt has been made to diagrammatically illustrate the result upon the gasket of such pressure exerted thereon. The arrows 15 indicate the direction of the pressure applied to the gasket between the faces 8 and 10. The effect of such pressure is indicated by the parallel lines 14, 14. The effect upon the gasket where it lies beyond the direct action of the faces 8 and 10 is indicated by the arrows 16, 16 etc., the result being the formation of a lobe such as 17 having the expanded sections 18 and 18 which expanding in the arc of a circle cause such lobes to make contact with the walls 19 as at 20, thus accomplishing a further seal by virtue of such contact. The fluid pressure controlled by the valve also operates to bear upon said lobe 17 as indicated by the arrows 21, 21, etc., in such a way as to force the lobe 17 against the walls 19, 19 and more completely accomplish the seal indicated at the point 20.

Figure 2:
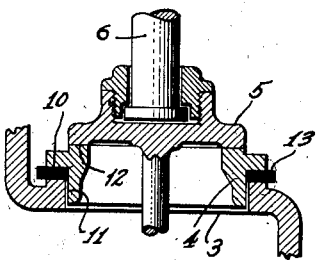
Fig. 2 is a detail of Fig. 1 in vertical section, showing the position of the elements before pressure is applied to the valve seat.
Figure 3:
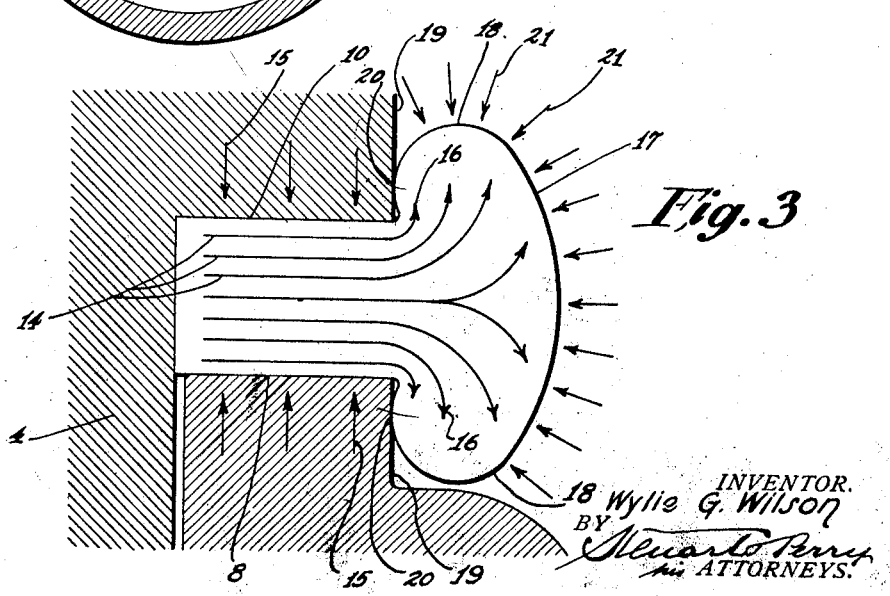
Fig. 3 is a diagrammatic view illustrating the effect upon the gasket when pressure is applied thereto.

It will be noted that in the construction shown in Figs. 1, 2 and 3 the gasket is contained between the opposed faces 8 of the valve port and 10 of the removable valve seat. It also abuts against the face 11 of the valve seat so that when the valve seat is depressed so as to compress the gasket the gasket can expand only in an outward direction to form the lobe 17 as previously stated.

In the construction shown in Fig. 4 it will be noted that the surface surrounding the valve port and at right angles to the axis thereof is wider than the opposed surface of the valve seat. One of these figures shows the gasket before compression is exercised thereon, and the second and lower figure shows the condition after compression. It will be noted in this illustration that by reason of the construction the lobe 17 can only be formed in an upward direction because of the fact that the face 8 is wider than the width of the gasket; otherwise, the operation is substantially the same as that previously described.

In Fig. 5 a slightly different construction is illustrated wherein a seat for the gasket is formed around the port, such seat having a face at right angles to the axis of the port and another parallel therewith, so that when the removable valve seat enters the port and rests on the gasket the gasket is enclosed on three sides but extends inwardly. The upper of these figures shows the condition before compression and the lower one after compression. In Fig. 6 a construction is shown wherein the face surrounding the port is at right angles to the axis thereof, and the face of the removable valve seat in like manner is at right angles to the axis of the port of the valve seat; in this case the gasket is made of greater width than each of said faces. The upper drawing indicates the condition before compression and the lower after compression.

From the foregoing it will be noted that the operation of the device is such that when a gasket having the characteristics above described is interposed between opposed faces in the manner indicated and pressure is exerted so as to compress said gasket a condition develops substantially as diagrammatically illustrated in Fig. 3, causing the material of which the gasket is formed either to flow or yield in such a way as to double on itself in the manner indicated by the arrows 16, thus accomplishing a seal with or without fluid pressure. Where fluid pressure is present as where said lobe 17 is exposed to the pressure controlled by the valve, in such case an additional force will be exerted upon said lobe 17 to accomplish the seal indicated at the point 20, but apart from the operation of such fluid pressure a seal will be accomplished by reason of the compression of the gasket and the formation of the lobe 17 as indicated.

What I claim is:

1. In a valve a gasket formed of suitable material to accomplish a seal between opposed surfaces, such gasket having the characteristic of being normally of uniform thickness and compressible and of a width greater than that of the opposed surfaces between which it is mounted, in combination with suitable opposed faces between which said gasket is mounted and means for pressing said faces together.

2. In a valve a gasket formed of suitable material to accomplish a seal between opposed surfaces, such gasket having the characteristic of being normally of uniform thickness and compressible and of a width greater than that of the opposed surfaces between which it is mounted, the section of the gasket extending beyond such surfaces being subject to the fluid pressure controlled by the valve, in combination with suitable opposed faces between which said gasket is mounted and means for pressing said faces together.

3. A valve comprising a port with a seat surrounding the same adapted to cooperate with a removable valve seat, a removable valve seat adapted to cooperate with said seat surrounding said port, a gasket interposed between said seat surrounding said port and said valve seat, said gasket being formed of material suitable for such use and having the characteristic of being normally of uniform thickness and compressible and of a width to overlap and extend beyond the opposed surfaces of said seats, a part of the gasket being exposed to the fluid pressure controlled by the valve, means whereby a suitable pressure may be exerted on said removable valve seat to compress said gasket.

4. A valve comprising a port with a seat surrounding the same adapted to cooperate with a removable valve seat, a removable valve seat adapted to cooperate with said seat surrounding said port, a gasket interposed between said seat surrounding said port and said valve seat, said gasket being formed of material suitable for such use and having the characteristic of being normally of uniform thickness and compressible and of a width to overlap and extend beyond the outer periphery of the opposed surfaces of said seats, a part of the gasket being exposed to the fluid pressure controlled by the valve, means whereby a suitable pressure may be exerted on said removable valve seat to compress said gasket.

5. A valve comprising a port with a seat surrounding the same adapted to cooperate with a removable valve seat, a removable valve seat adapted to cooperate with said seat surrounding said port, a gasket interposed between said seat surrounding said port and said valve seat, said gasket being formed of material suitable for such use and having the characteristic of being normally of uniform thickness and compressible and of a width to overlap and extend beyond the inner periphery of the opposed surfaces of said seats, means whereby a suitable pressure may be exerted on said removable valve seat to compress said gasket.

6. A valve comprising a port with a seat surrounding the same formed with a face in a plane at right angles to the axis of said port, a removable valve seat formed with a face in a plane at right angles to the axis of a port through the center of said valve seat, said faces being adapted to cooperate, a gasket interposed between said faces, said gasket being formed of material suitable for such use and having the characteristic of being normally of uniform thickness and compressible and of a width to extend beyond the width of the said faces, a part of said gasket being exposed to the fluid pressure controlled by the valve, means whereby a suitable pressure may be exerted on said removable valve seat to compress said gasket.

7. A valve comprising a port with a seat surrounding the same, formed with a face in a plane at right angles to the axis of the port, a removable valve seat formed with a face in a plane at right angles to the axis of the port, said faces adapted to cooperate, said valve seat also having a dependent flange with a face parallel with the axis of said valve seat, said dependent flange adapted to enter and register with the port, a gasket interposed between said opposed faces at right angles to the axis of the port and the removable valve seat and abutting against the face of the valve seat which is parallel with its axis, said gasket being formed of a material suitable for such use and having the characteristic of being normally of uniform thickness and compressible and of a width to extend beyond the width of said faces, a part of said gasket being exposed to the fluid pressure controlled by the valve, means whereby a suitable pressure may be exerted on said removable valve seat to compress said gasket.

8. A valve comprising a port with a seat surrounding the same, formed with a face in a plane at right angles to the axis of said port, and also with a face parallel with such axis, a removable valve seat formed with a face in a plane at right angles to the axis of the port through said valve seat, said face being adapted to cooperate with said faces of the valve seat, a gasket interposed between said faces which are in a plane at right angles to the axis of the port and the valve seat and abutting against that face of the valve seat which is parallel with the axis of said port, said gasket being formed of a material suitable for such use and having the characteristic of being normally of uniform thickness and compressible and of a width to extend beyond the width of said faces, a part of said gasket being exposed to the fluid pressure controlled by the valve, means whereby a suitable pressure may be exerted on said removable valve seat to compress said gasket.

9. In combination with a valve comprising a valve-body having a support, a removable valve-seat mounted on said support, and a sealing member adapted to cooperate with the seat and having means for imposing regulatable pressure thereon; a gasket formed of suitable material to accomplish a seal between the support and the valve-seat, said gasket having the characteristic of being normally of uniform thickness and compressible and being of a width greater than that of the surfaces between which it is mounted, and said gasket being adapted to be expanded beyond the planes of pressure imposed thereon so as to constitute a seal between the support and seat.

10. In combination with a valve comprising a valve-body having a support, a valve-seat mounted on said support, and a sealing member adapted to cooperate with the seat and having means for imposing regulatable pressure thereon; a gasket formed of suitable material to accomplish a seal between the support and the valve-seat and inserted between the support and seat, said gasket having the characteristic of being normally of uniform thickness and compressible and being of a width greater than that of the surfaces between which it is mounted, and said gasket being adapted to be expanded beyond the planes of pressure imposed thereon so as to constitute a seal between the support and seat.

11. In combination with a valve comprising a valve-body having a support, a valve-seat mounted on said support and having a smooth, flat seal-receiving seat, and a sealing member having a smooth, flat face adapted to cooperate with the said seat, and having means for imposing regulatable pressure thereon; a gasket formed of suitable material to accomplish a seal between the support and the valve-seat and inserted between the support and the seat, said gasket having the characteristic of being normally of uniform thickness and compressible and being of a width greater than that of the surfaces between which it is mounted, and said gasket being adapted to be expanded beyond the planes of pressure imposed thereon so as to constitute a seal between the support and seat.

Signed by me at New York this 18th day of October 1922.

WYLIE G. WILSON.

Witnesses:
 BERTRAND D. DEPIERRIS,
 SADIE H. OLIKER.